(12) United States Patent
Park

(10) Patent No.: US 6,941,137 B2
(45) Date of Patent: Sep. 6, 2005

(54) SYSTEM AND METHOD FOR SUPERVISING REPEATER BY USING WIRELESS MOBILE

(75) Inventor: Sang-Wook Park, Goyang-si (KR)

(73) Assignee: KTFreetel Co., Ltd., Seoul (KR)

( * ) Notice: Subject to any disclaimer, the term of this patent is extended or adjusted under 35 U.S.C. 154(b) by 508 days.

(21) Appl. No.: 10/018,570

(22) PCT Filed: Apr. 27, 2001

(86) PCT No.: PCT/KR01/00704

§ 371 (c)(1),
(2), (4) Date: Dec. 20, 2001

(87) PCT Pub. No.: WO01/82512

PCT Pub. Date: Nov. 1, 2001

(65) Prior Publication Data

US 2003/0013410 A1 Jan. 16, 2003

(30) Foreign Application Priority Data

Apr. 7, 2000 (KR) ......................................... 2000-22558

(51) Int. Cl.⁷ .............................. H04Q 7/20; H04B 7/15
(52) U.S. Cl. ........................ 455/423; 455/11.1; 455/466
(58) Field of Search ............................... 455/11.1, 13.1, 455/67.11, 423, 450, 466, 703, 115.1, 115.2, 115.3, 134, 135; 340/531, 539.1, 539.26; 370/331, 332

(56) References Cited

U.S. PATENT DOCUMENTS

| | | | | |
|---|---|---|---|---|
| 5,133,081 A | * | 7/1992 | Mayo | 455/18 |
| 5,479,400 A | | 12/1995 | Dilworth et al. | 370/331 |
| 6,031,455 A | | 2/2000 | Grube et al. | 340/539.26 |
| 6,556,325 B1 | * | 4/2003 | Horiuchi et al. | 398/177 |

FOREIGN PATENT DOCUMENTS

| | | | | | |
|---|---|---|---|---|---|
| JP | 05259936 A | * | 10/1993 | | H04B/1/60 |
| JP | 06125285 A | * | 5/1994 | | H04B/3/36 |
| JP | 09036859 A | * | 2/1997 | | H04L/12/24 |
| KR | 2000-45268 | | 7/2000 | | |

* cited by examiner

Primary Examiner—George Eng
(74) Attorney, Agent, or Firm—Finnegan, Henderson, Farabow, Garrett & Dunner, L.L.P.

(57) ABSTRACT

The present invention relates to repeater supervision system and method for managing and operating remote repeater by supervising and analyzing the quality of wireless and the quality of telephone call on repeater to enlarge a service area. The repeater supervision system comprises a repeater supervision apparatus for collecting electronic waves generated from the repeater, analyzing the collected electronic waves using a program designated beforehand and transmitting the analyzed results, a SMS center for receiving the analyzed results from repeater supervision apparatus and transmitting the analyzed results, a repeater management apparatus for receiving the analyzed results from the SMS center and managing the repeater, a storage for storing the analyzed results by the repeater management apparatus.

8 Claims, 11 Drawing Sheets

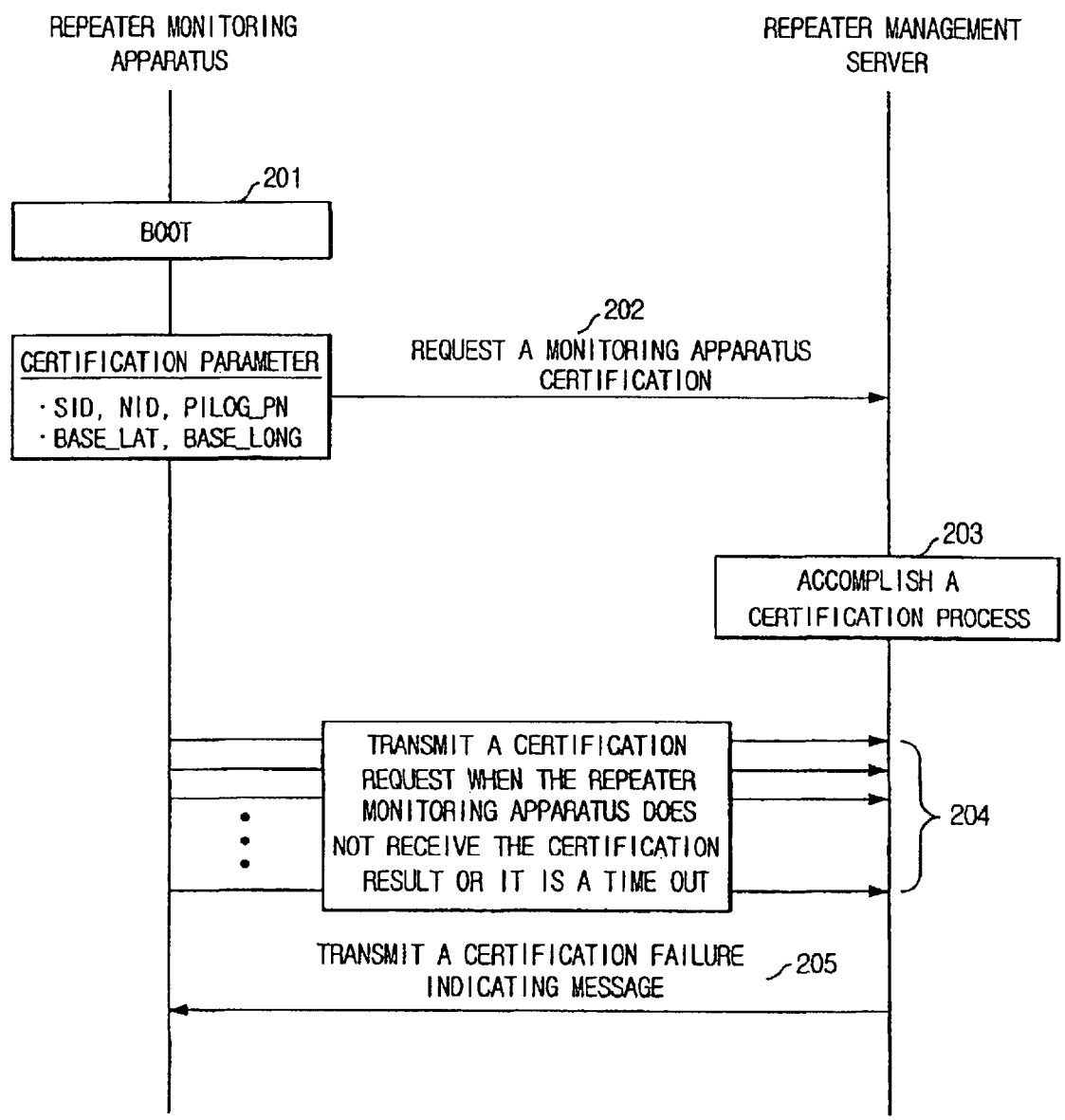

FIG. 2B

| CMD (2byte) | SID (4byte) | NID (4byte) | PILOT_PN (3byte) | CDMA-FREQ (3byte) | BASE_LAT (4byte) | BASE_LONG (4byte) |

FIG. 4B

| CMD (2byte) | TIME (12byte) | CDMA_FREQ (3byte) | PILOT_PN (3byte) | RSSI (4byte) | ECIO (4byte) | TX_ADJ (4byte) | TX_PWR (4byte) | FLAG (1byte) | SEQ# (4byte) |

FIG. 6A

| CMD (2byte) | TYPE (1byte) | FLAG (1byte) | SEQ# (4byte) |
|---|---|---|---|

FIG. 6B

| CMD (2byte) | TYPE (1byte) | FLAG (1byte) | SEQ# (4byte) |
|---|---|---|---|

SYSTEM AND METHOD FOR SUPERVISING REPEATER BY USING WIRELESS MOBILE

TECHNICAL FIELD

The present invention relates to a repeater monitoring system and method for managing and operating a remote repeater by monitoring and analyzing the repeater's quality in wireless and regular telephone calls in order to enlarge a service area.

BACKGROUND OF THE INVENTION

The present invention relates to a repeater monitoring system and method for managing and operating a remote repeater by monitoring and analyzing the wireless quality and the telephone call quality of the repeater in order to enlarge a service area.

A base station system and a repeater are used according to traffic density in order to enlarge service areas in a wireless communications network (a mobile communications network, a personal portable communications network etc). At this point, the base station system is installed in the best location according to the number of entrances which can be accommodated by the base station system while it is satisfying the number of entrances in high traffic density service areas and the quality of service required of the wireless communications network.

A repeater is the apparatus used for enlarging the area of service economically in an area having a relatively low density of entrances.

A repeater enlarges a service area by repeating the wireless (RF or IF) signals from a mother base station to the service areas using wireless or broadband transmission apparatuses. A repeater is installed in various areas such as at apartment complexes, on the insides of buildings, and in basements, subways, farms or fishing areas.

A wireless communications network enterprise must maintain and repair a network structure system continuously in order to provide the best quality in telephone service to members.

More specifically, the operation of a base station system is carried out by integrating and analyzing the information collected from each base station management system through the use of exclusive lines connecting the base station system with the base station management systems.

The past method for monitoring repeaters made use of apparatuses monitoring operations of the repeater for malfunctions that were installed in the essential blocks of the repeaters. The past method for monitoring repeaters involved the use of repeaters that comprised a communication apparatus such as a wire modem. A central management apparatus of the network management center checks the repeater monitoring apparatus periodically using the wire network. In addition, the repeater monitoring apparatus transmitted data to the network management center whenever specified situations occurred.

However, a problem with the past method for monitoring repeaters was the difficulty of securing exclusive lines between the mother base station and the repeater.

Moreover, even when exclusive lines between the mother base station and the repeater were secured, there were difficulties with the mother base station first collecting information about a repeater's operations and then transmitting it to a network management center.

Moreover, previous repeater monitoring systems were excessively expensive to construct and operate, as well as difficult to manage.

SUMMARY OF THE INVENTION

The object of the present invention is to provide a repeater monitoring method and system for managing and operating a remote repeater by monitoring and analyzing the quality of telephone and wireless communications using a repeater in order to enlarge a service area.

Another object of the present invention is to provide a repeater monitoring method and system for easily securing exclusive lines between a mother base station and repeaters.

Another object of the present invention is to provide a repeater monitoring method and system for managing a monitoring system at a lower cost.

To accomplish the objects of the present invention, according to one preferred embodiment of the present invention, a repeater monitoring system is provided for enlarging service areas based on a wireless communications network, which system comprises a repeater monitoring apparatus for selecting waves transferred from repeaters, analyzing the waves by using particular programs, and transmitting analyzed results; an SMS center for receiving the analyzed results from the repeater monitoring apparatus and transmitting the analyzed results; a repeater management server for receiving the analyzed results from the SMS center and managing a plurality of repeaters; and a storage apparatus for saving the analyzed results received from the repeater management server.

The analyzed results received from the repeater monitoring apparatus are information in the form of short messages.

The information resulting from analysis comprises at least one of the following: an analysis time; an identification of a terminal manufacturing company corresponding to a mobile communications company (SID); a telephone exchange identification used by the repeater (NID); a noise measurement (PILOT_PN); a received message signal strength indicator (RSSI); a signal-to-interference rate (Ec/Io); and a transmitted message signal strength indicator (TX_PWR).

The SMS center further comprises the means for finding and selecting short messages including analysis results from a plurality of short messages.

The repeater management server modifies the analysis result transmission period of the repeater monitoring apparatus through a communications network.

The communications network is a mobile communications network.

The repeater monitoring apparatus comprises an incoming terminal, a line for incoming external power sources, and a transformer for adjusting power levels. The power levels of power sources adjusted by the transformer must be 12V, 7.2V, or 3.6V.

The repeater monitoring apparatus further comprises an external wave cover case for connecting with a repeater.

According to another preferred embodiment of the present invention, a repeater monitoring apparatus is provided for enlarging service areas based on a wireless communications network, which apparatus comprises a storage device and a processor coupled to the storage device; a storage device storing a program for controlling the processor; and a processor that operates the program to receive electronic waves sent out from a repeater, analyze the received electronic waves and transmit the results of analysis to the repeater management server.

The analysis results comprise at least one kind of information such as the analysis time, the identification of a terminal manufacturing company corresponding to a mobile communications company (SID), the telephone exchange identification used by the repeater (NID), a noise measurement (PILOT_PN), the received message signal strength indicator (RSSI), the signal-to-interference rate (Ec/Io), and the transmitted message signal strength indicator (TX_PWR).

According to still another preferred embodiment of the present invention, a repeater monitoring apparatus is provided for enlarging service areas based on a wireless network, and this apparatus comprises a storage device and a processor coupled to the storage device, a program stored in the storage device for controlling the processor, and a processor that operates the program to receive analysis results from the repeater monitoring apparatus, save the received analysis results to a storage apparatus, and transmit the received analysis results to a manager's terminal.

The processor further operates the program to compile statistics about the saved analysis results according to fixed conditions.

According to still another preferred embodiment of the present invention, a method is provided for certifying a repeater monitoring apparatus, and this method comprises the steps of determining whether or not the repeater monitoring apparatus is in operation, transmitting a certification request from the repeater monitoring apparatus to a repeater management server when the repeater monitoring apparatus is in operation, and receiving a confirmation of certification from the repeater management server.

The communications network is a mobile communications network.

The certification request comprises at least one of the following kinds of information: the identification of a terminal manufacturing company corresponding to a mobile communications company (SID), the telephone exchange identification used by a repeater (NID), a noise measurement (PILOT_PN), the latitude of the repeater monitoring apparatus (BASE_LAT), and the longitude of the repeater monitoring apparatus (BASE_LONG).

According to still another preferred embodiment of the present invention, a method is provided for setting up the report period of a repeater monitoring apparatus, which method comprises the steps of: receiving a request for adjustments from a repeater management server consisting of basic information for setting up the report period of a particular repeater monitoring apparatus, saving the received setup information as the default report period of the repeater monitoring apparatus; and transmitting the results of adjustments to the repeater management server.

The communications network is a mobile communications network.

The adjustment request comprises at least one of the following kinds of information: a report period and the sequence number of the adjustment request.

According to still another preferred embodiment of the present invention, a method is provided for transmitting the analysis results of a repeater monitoring apparatus, and this method comprises the steps of: selecting electronic waves sent out from repeaters; setting up a period for regularly reporting results from the analysis of the electronic waves; analyzing the electronic waves using specified programs according to the report period; and transmitting the results from analysis to the repeater management server.

This method further comprises the steps of: receiving an adjustment request from a repeater management server comprising basic information for setting up the report period of the repeater monitoring apparatus, and saving the received basic information as the default report period of the repeater monitoring apparatus.

The communications network is a mobile communications network.

The analysis results comprise at least one of the following kinds of information: the analysis time, the identification of a terminal manufacturing company corresponding to a mobile communications company (SID), the telephone exchange identification used by the repeater (NID), a noise measurement (PILOT_PN), the received message signal strength indicator (RSSI), a signal-to-interference rate (Ec/Io), and the transmitted message signal strength indicator (TX_PWR).

BRIEF DESCRIPTIONS OF THE DRAWINGS

The above objects and other advantages of the present invention will become more apparent by detailed descriptions of the preferred embodiments thereof with reference to the attached drawings, in which:

FIG. 2a is a flowchart illustrating the method of certifying the repeater monitoring apparatus of the present invention;

FIG. 2b is one example of a certification parameter for the present invention;

FIG. 4b is one example of a message for reporting quality data in the present invention;

FIG. 6a is one example of a process result message in the present invention;

FIG. 6b is one example of a message requesting that information be registered again in the present invention;

A KEY TO NUMERIC SYMBOLS REFERRING TO THE MAJOR PARTS OF THE DRAWINGS

Figure 1:
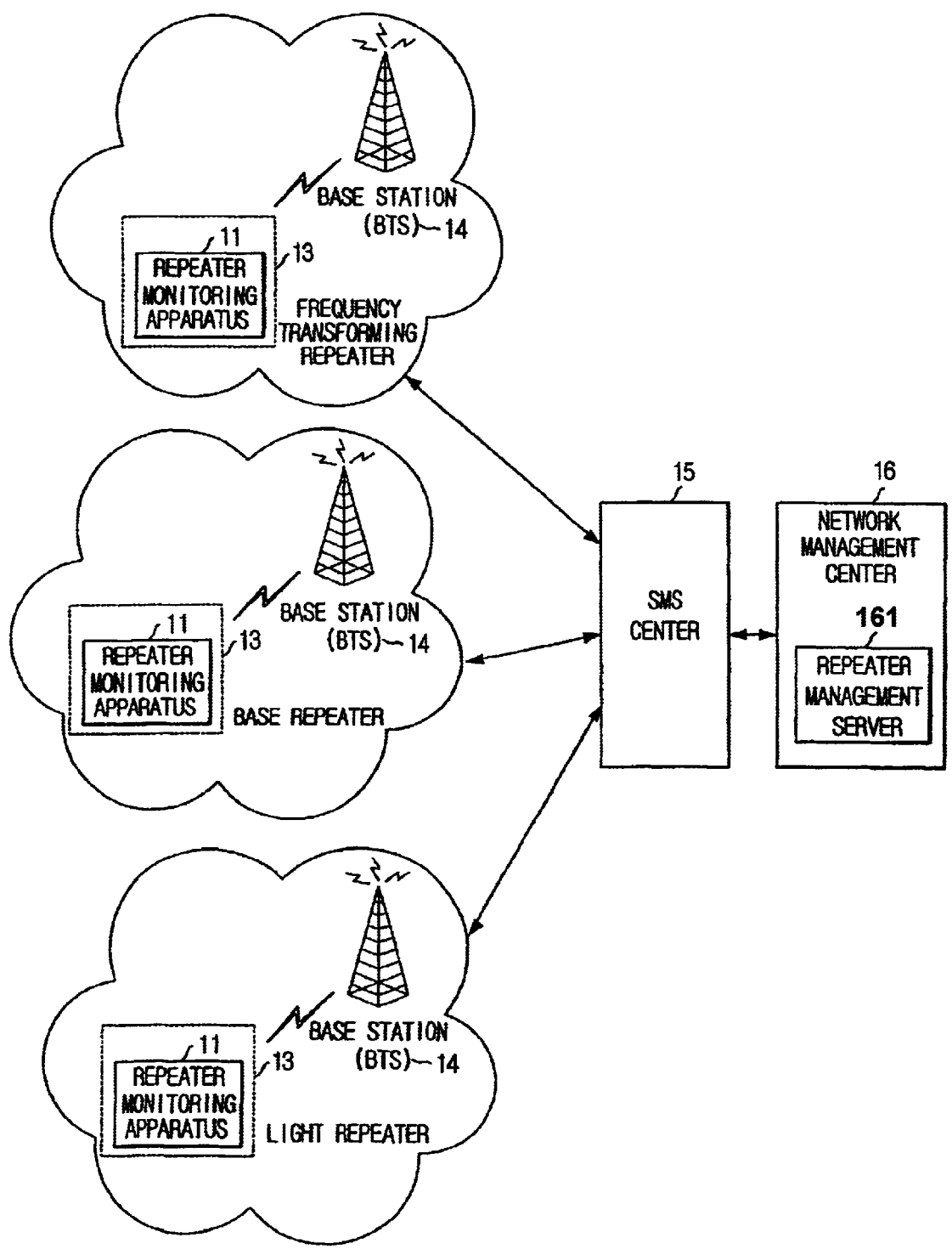
FIG. 1 is a schematic diagram of the repeater monitoring system of the present invention.

11 . . . repeater monitoring apparatus
13 . . . repeater
14 . . . base station
15 . . . SMS center
16 . . . network management center
161 . . . repeater management server Embodiment Hereinafter, preferred embodiments of the present invention will be described in more detail with reference to the accompanying drawings, but it is understood that the present invention should not be limited to the following embodiments.

FIG. 1 is a schematic diagram of the repeater monitoring system in the present invention.

Referring to FIG. 1, the repeater monitoring system comprises a repeater monitoring apparatus 11 and a repeater 13, which comprises a frequency transforming repeater, a light repeater and a base repeater. The repeater monitoring system further comprises a base station (BST) 14, an SMS center 15, a network management center 16 and a repeater management server 161.

The repeater monitoring apparatus 11 is installed in the repeater 13. When the repeater monitoring apparatus 11 receives a request from the repeater management server 161 to report a repeater's operation status, the apparatus transmits analysis results to the repeater management server 161 by means of a wireless signal. The repeater monitoring apparatus 11 communicates with a concentration management server by using a conventional mobile terminal. The repeater monitoring apparatus 11 comprises a water-powered terminal for supplying power from different sources, which is coupled with the repeater 13; a transformer for adjusting the power levels to a preferred standard, and a terminal (for example an RS-232C terminal) for connecting the monitoring apparatus to a repeater control port.

Generally, the repeater 13 consists of a frequency transforming repeater, a light repeater, a base repeater or other types of repeaters. These repeaters are used in the wireless mobile communications system generally, and they have the following merits and demerits respectively. First, the frequency transforming repeater is less restricted in terms of where it can be installed but is very limited in its frequencies. In addition, the frequency transforming repeater has a complex and expensive system. The light repeater can reply with a signal like the one received and can reply with a large output. But the light repeater's signal is limited in range and the system is expensive to install and operate.

The repeater management server 161 determines the status of the repeaters managed by the network management center 16 at a manager's request or at regular intervals set by the manager. Moreover, when the status of the repeater 13 is unusual, the repeater management server 161 informs the manager that the repeater is out of order.

In other words, the repeater monitoring system of the present invention is a system for monitoring the repeaters 13, which can be used in order to enlarge the service area of a wireless communications network. Moreover, the repeater monitoring system of the present invention comprises the repeater monitoring apparatus 11. The repeater monitoring apparatus 11 analyzes the electronic waves sent out from the repeater 13 by using its electronic wave measurement function, and then transmits the results of an analysis of malfunctions and wireless signal quality. Moreover, the repeater monitoring system of the present invention analyzes malfunctions and measurements of wireless signal quality by using the repeater monitoring apparatus 11 of a mobile communications terminal. In addition, the repeater monitoring system identifies the signal by a particular number. The repeater monitoring system collects and analyzes quality measurement data concerning telephone calls, and then transmits the results of analysis by means of a wireless communications network.

In addition, the repeater monitoring system of the present invention stores information on malfunctions and wireless signal quality measurements in a database in order to operate the repeater. The repeater monitoring system consists of a repeater management server 161, which determines the status of the repeater and reports its malfunction to the manager.

The repeater monitoring system of the present invention further comprises a program that performs an exclusive monitoring function (not illustrated in the attached drawings) for collecting data on the status of the repeater 13 and transmitting the data to the repeater monitoring apparatus 11. Currently, the program that performs the exclusive monitoring function is installed in the repeater 13.

Hereinafter, each component of the repeater monitoring system will be described in more detail.

The repeater monitoring apparatus 11 collects and analyzes the wireless signal quality of the repeater 13 periodically. In addition, the repeater monitoring apparatus 11 transmits the results of analysis to the repeater management server 161, identifies a signal by a particular number, and analyzes the quality of telephone calls. When the repeater monitoring apparatus 11 ascertains the malfunction of the repeater 13, it transmits information concerning the malfunction to the repeater management server 161.

In addition, the network management center 16 receives data on the signal quality of wireless and telephone communications from the repeater monitoring apparatus 11, ascertains the status of the repeater 13, and informs the manager that the repeater is out of order. At the manager's request, the repeater monitoring apparatus 11 collects and analyzes the signal quality data at regular intervals.

The repeater monitoring apparatus 11 analyzes the electronic waves sent out from the repeater 13 by using the program with a channel analysis function (i.e., the electronic wave monitoring function). Then it transmits the signal quality data concerning wireless and telephone communications to the repeater management server 161 in the form of short messages.

The SMS center 15 receives a number of short messages from various repeater monitoring apparatuses 11 and various terminals of mobile communications subscribers. The SMS center 15 extracts the short messages corresponding to the repeater monitoring apparatus 11 from among all the short messages received, and transmits the extracted short messages to the repeater management server 161. These extracted short messages are short messages containing test result data on the electronic wave quality of repeaters.

We will now describe in more detail the main functions of the repeater monitoring apparatus 11, which is a main component of the repeater monitoring apparatus of the present invention. The repeater monitoring apparatus 11 periodically collects and analyzes data on the wireless signal quality of the repeaters 13. When a repeater 13 is out of order, the repeater monitoring apparatus 11 reports the status of the repeater to the repeater management server 161.

The repeater monitoring apparatus 11 stores data on the acceptable noise level (PN) of the repeaters that is set by the manager. In addition, the repeater monitoring apparatus 11 stores a received signal strength indicator (RSSI) and data specifying the frequency of malfunction status reports. The received signal strength indicator (RSSI) is the wireless signal quality data for ascertaining the malfunction of the repeater 13, and data the specifying the frequency of malfunction status reports is the frequency of reports on the signal-to-interference rate (Ec/Io) corresponding to preset report intervals.

The repeater monitoring apparatus 11 stores the frequency alignment (FA) number serviced by the repeater 13 in order to analyze the wireless quality data of all frequency bands corresponding to the repeaters 13. Or the repeater monitoring apparatus 11 receives the FA number from the repeater management server 161, and monitors the wireless quality periodically, and analyzes the wireless quality of the FA in order to analyze the wireless quality data of all frequency band corresponding to the repeater 13.

Moreover, the wireless quality data requesting the period of the repeater monitoring apparatus 11 is set up by the manager. The repeater monitoring apparatus 11 grasps the malfunction of the repeater 13 and reports the malfunction status of the repeater to the repeater management server 161.

Moreover, the repeater monitoring apparatus 11 couples a signal to a particular number and analyzes the telephone call quality. And when it grasps the deterioration of the telephone call quality, transmits the malfunction alarm to the repeater management server 161.

The massage transmission between the repeater management server 161 and the repeater monitoring apparatus 11 is achieved by the SMS based on the wireless communications network. And the wireless communications enterprise can use a particular protocol for the trustworthy repeater monitoring system.

That is, the confidence of the repeater monitoring system is assured by the management and certification of the repeater monitoring apparatus 11. At this point, the wireless communications enterprise manages and monitors the repeater monitoring apparatus 11 by using the peculiar number of the repeater monitoring apparatus 11. And the repeater monitoring apparatus 11 operates according to the request of the repeater management server 161.

In addition, when the repeater 13 provides the exclusive monitor port for reporting the status, the repeater monitoring apparatus 11 collects and reports the status of the repeaters.

The reporting method can be the message information service by using the particular protocol of the wireless communications enterprise. And the reporting method can be the message information service by an exclusive line or a dial-up modem.

Moreover, the repeater monitoring system of the present invention resets the hardware or the software of the repeater 13 in order to recover the malfunction status by the manager's request or the malfunction status critical value. At this point, a reset apparatus is set in the repeater 13.

Moreover, the repeater management server 161 and the repeater monitoring apparatus 11 stores the system software version of the repeater monitoring system. And the repeater management server 161 upgrades the system software of the repeater monitoring system by the request of the manager of the repeater management server 161. At this point, the system software is transmitted by using the data service the short message service and other services) or transmitted by the data service provided by the wired modem or wireless modem.

Referring FIG. 1 again, according to one preferred embodiment of the repeater monitoring system, the repeater monitoring system comprises the repeater management server 161, the repeater monitoring apparatus 11, the SMS (short message service) center and the network management center 16.

The repeater management server 161 is installed in the network management center 16 and it is managed by the manager. The repeater monitoring apparatus 11 is installed in the repeater 13 or around the repeater 13. The SMS center(SMC) 15 transmits information between the repeater monitoring apparatus 11 and the repeater management server 161.

The network management center 16 accomplishes the terminal management function. At this point, the terminal management function is the function for accomplishing the certification according to the terminal connection standard of the vehicle message service.

In the case of the light repeater or the frequency transforming repeater, the repeater monitoring apparatus 11 is installed in the repeater 13. In the case of the base repeater, the repeater monitoring apparatus 11 is installed the forehead or the inside of the external case of the repeater.

Moreover, the repeater monitoring apparatus 11 operates by the power sources provided from the repeater 13.

The repeater monitoring apparatus 11 comprises the transformer for transforming the preferred standard of the power sources and the external wave cover case for connecting the repeater 13 with itself. For example, the power sources transformed by the transformer are at least one selected from the group consisting of 12V, 7.2V, 3.6V.

FIG. 2a is a flowchart for illustrating the method for certificating the repeater monitoring apparatus in the present invention. And FIG. 2b is one example of a certification parameter in the present invention.

Referring to FIG. 2a, when the repeater monitoring apparatus 11 becomes a normal status by booting(201), the repeater monitoring apparatus 11 accomplishes a monitoring apparatus certification request received from the repeater management server 161(202).

Hereinafter, the certification parameter(for example, about 30 byte) of the repeater monitoring apparatus 11 will be described in more detail with reference to FIG. 2b.

Referring to FIG. 2b, the certification parameter comprises 'CMD' item, 'SID' item, 'NID' item, 'PILOT_PN' item, 'CDMA_FREQ', 'BASE_LAT' item and 'BASE_LONG' item.

The 'CMD' item is set as '01', and the 'SID' item is the identification(ID) of each terminal manufacturing company corresponding to the mobile communications enterprise and the 'NID' item is the identification(ID) of telephone exchange used by the measuring repeater.

The 'PILOT_PN' item is the decision noise number, and the 'CDMA_FREQ' is correspondent to the frequency value of the CDMA. 'BASE_LAT' item and the 'BASE_LONG' item is correspondent to the latitude and the longitude of the repeater monitoring apparatus 11.

Moreover, the 'BASE_LAT' item and the 'BASE_LONG' item are used in order to indicate the location of the base station, and can be used as the base data for certification.

Referring to FIG. 2a again, when the repeater management server 161 receives the certification request including the certification parameter from the repeater monitoring apparatus 11, the repeater management server 161 accomplishes the certification process by using the programs stored in the server system(203).

When the repeater monitoring apparatus 11 does not receive the certification result from the repeater management server 161, the repeater monitoring apparatus 11 transmits the certification request to the repeater management server 161 each fixed time(204).

The repeater management server 161 applies the parameter included in the received certification request. And the repeater management server 161 determines whether or not the parameter is correspondent to the terminal manufacturing company identification(ID), which is stored in the server 161 system, or the telephone exchange identification(ID), which is used by the measured repeater 13.

As the result of the determination, when the parameter is correspondent, confirms the certification. As the result of the determination, when the parameter is not correspondent, the repeater management server 161 transmits a certification failure indicating message to the repeater monitoring apparatus 11(205).

Figure 3A:
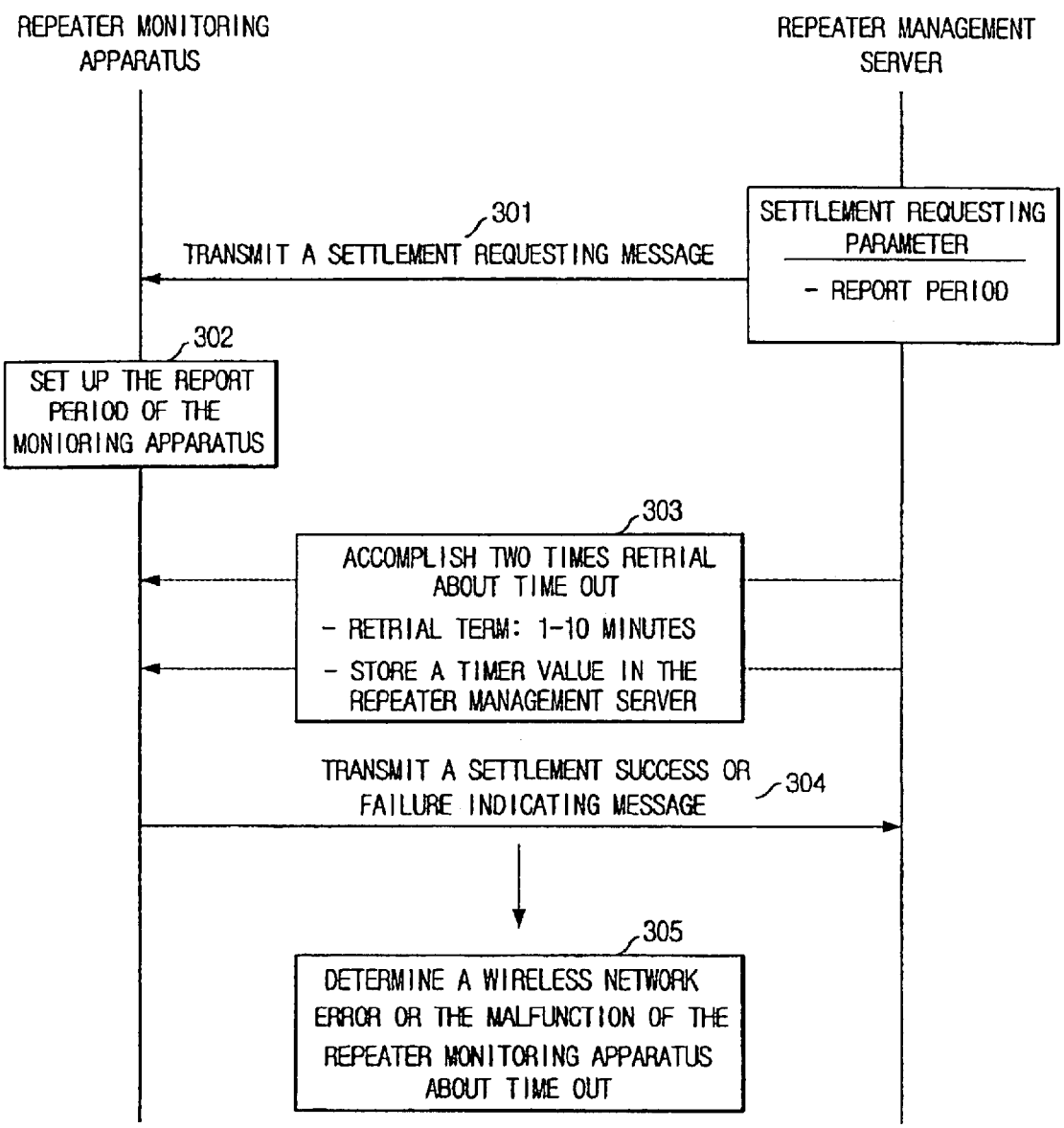
FIG. 3a is a flowchart illustrating the method for setting up the report period of the repeater monitoring apparatus in the present invention.
Figure 3B:
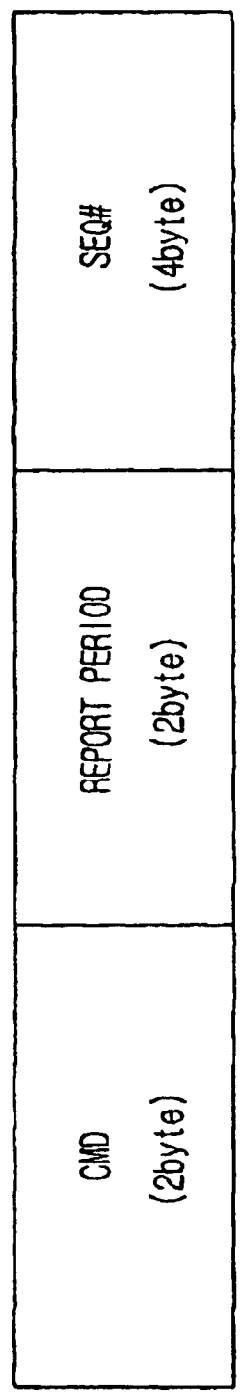
FIG. 3b is one example of a parameter for requesting the period adjustment of the repeater monitoring apparatus in the present invention.

FIG. 3a is a flowchart for illustrating the method for setting up the report period of the repeater monitoring apparatus in the present invention, and FIG. 3b is one example of a parameter for requesting the period fixing of the repeater monitoring apparatus in the present invention.

Referring to FIG. 3a, the repeater management server 161 transmits a settlement requesting message to the repeater monitoring apparatus 11 in order to set up a system basic value of the certificated repeater monitoring apparatus 11(301).

The settlement requesting message comprises the message(for example, the message is about 8 byte), requesting to change the report period of the repeater monitoring apparatus 11 and other information.

Hereinafter, the period settlement requesting parameter will be described with reference to FIG. 3b.

The period settlement requesting parameter comprises 'CMD' item, 'Report Period' item and 'Seq#' item.

The 'CMD' item is set as '02', and the 'Report Period' item is correspondent to the quality measurement reporting period, and the 'Seq#' item is correspondent to the sequential number(for example, one value selected from 0000 to 9999) of the settlement requesting message. At this point, the quality measurement reporting period is set, for example, on 10 minutes, 30 minutes as the basic value. That is to say, '01' is correspondent to 10 minutes and '03' is correspondent to 30 minutes. The smallest number can be '01' and the biggest number can be '18'.

Moreover, the sequential number(Seq#) of the settlement requesting message is stored in the 'Seq#' of the message reception confirming message. And used in the repeater management server 161 in order to determine to receive the settlement requesting message.

Accordingly, when the repeater management server 161 wants to change the report period of the repeater monitoring apparatus 11, can change the report period by transmitting the settlement requesting message corresponding to the changed period value.

Referring to FIG. 3a again, the repeater monitoring apparatus 11 updates the report period saved in the repeater monitoring apparatus 11 according to the received period settlement requesting message.

If the reception is not accomplished successfully, then the repeater management server 161 accomplish several times retrials repeatedly(303). For example, the retrials are set the retrial term 1~10 minutes, and the timer value is stored in the repeater management server 161.

When the retrial work is finished, the repeater monitoring apparatus 11 transmits the settlement result information to the repeater management server 161(304). The settlement result information comprises a settlement confirming information and a settlement failure indicating message and other information. Moreover, the repeater management server 161 determines wireless network errors or malfunctions of the repeater monitoring apparatus about time out(305).

Figure 4A:
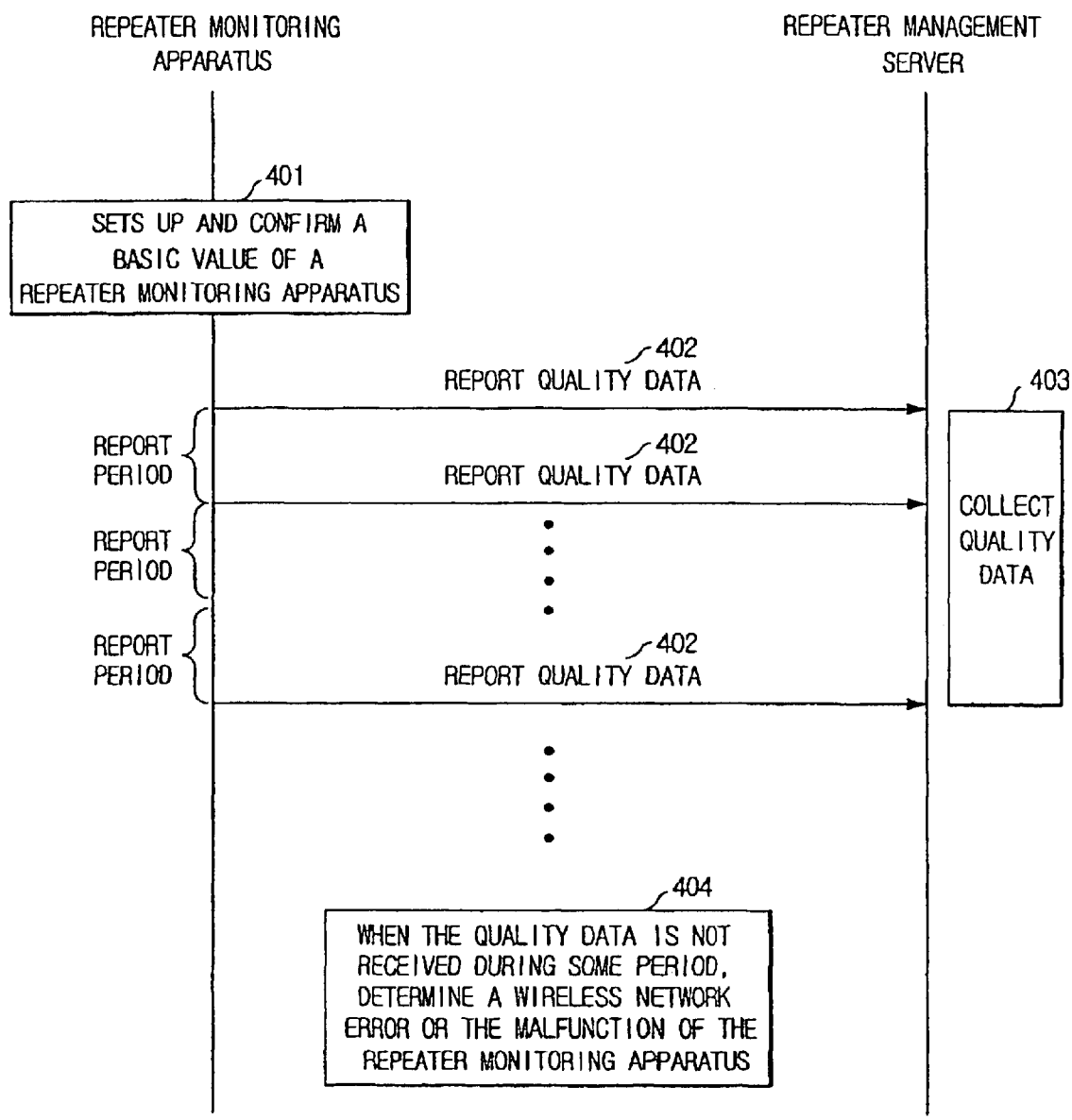
FIG. 4a is a flowchart illustrating the method for reporting a quality measurement result in the present invention.
Figure 4C:
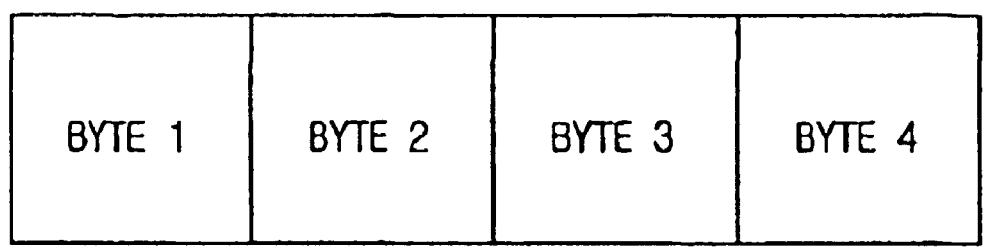
FIG. 4c is a schematic diagram of quality data in the present invention.

FIG. 4a is a flowchart for illustrating the method for reporting a quality measurement result in the present invention and FIG. 4b is one example of the message for reporting a quality data in the present invention and FIG. 4c is a schematic diagram of the quality data in the present invention.

Referring to FIG. 4a, the repeater monitoring apparatus 11 sets up a basic value of the quality data report period of the repeater 13, and confirms it(401). Moreover, the repeater monitoring apparatus 11 collects and analyzes the quality data according to the report period, and reports the analyzed result to the repeater management server 161(402).

The repeater management server 161 receives a plurality of quality data from the repeater monitoring apparatus 11, and collects the data(403).

When the quality data is not received during some period, the repeater management server 161 determines the wireless network errors or the malfunctions of the repeater monitoring apparatus 11(404).

The quality data reporting message(for example, about 31 byte) will be described in more detail with reference to the FIG. 4b.

Referring to FIG. 4b, the quality data reporting message comprises 'CMD' item, 'TIME' item, 'CDMA_FREQ' item, 'PILOT_PN' item, 'RSSI' item, 'ECIO' item, 'TX_ADJ' item, 'TX_PWR' item, 'FLAG' item and 'SEQ#' item and other information.

The 'CMD' item is set as '10', and the 'TIME' item is correspondent to the present time of the repeater monitoring apparatus 11, and the 'CDMA_FREQ' item is correspondent to the measured CDMA frequency value, and the 'PILOT_PN' item is correspondent to the measured pilot decision noise.

The 'RSSI' item is correspondent to the degree of strength of the inverse directional message signal, and the 'RSSI' value applied in the repeater monitoring apparatus is the average of the 'RSSI' values collected for 1 hour.

The 'ECIO' item is correspondent to the signal-to-interference rate(Ec/Io), and the signal-to-interference rate applied by the repeater monitoring apparatus 11 is the average of 'ECIO' values collected for 1 hour.

The 'TX_ADJ' item is correspondent to a front direction message signal strength, and the front direction message signal strength applied by the repeater monitoring apparatus 11 is the average of the front direction message signal strength collected for 1 hour.

The 'RSSI' item, the 'ECIO' item, the 'TX_ADJ' item, the 'TX_PWR' item is measured values, and the measured values is composed of 4 byte with reference to FIG. 4c.

Referring to FIG. 4c, the structure of the measured value comprises 'Byte 1' item, 'Byte 2' item, 'Byte 3' item, 'Byte 4' item. At this point, 'Byte 1' 0 means a positive number and 1 means a negative number. And the 'Byte 2' item, the 'Byte 3' item and the 'Byte 4' item are applied between 0 and 9.

Referring to FIG. 4b again, the 'FLAG' item means type of the quality data reported(for example, '0' is the report according to the period and '1' is the report by direct request), and the 'Seq#' item means the sequential number (for example, the sequential number is one between 0000 and 9999) of the quality data. At this point, packet loss can be estimated by using the sequential number of the quality data.

Figure 5A:
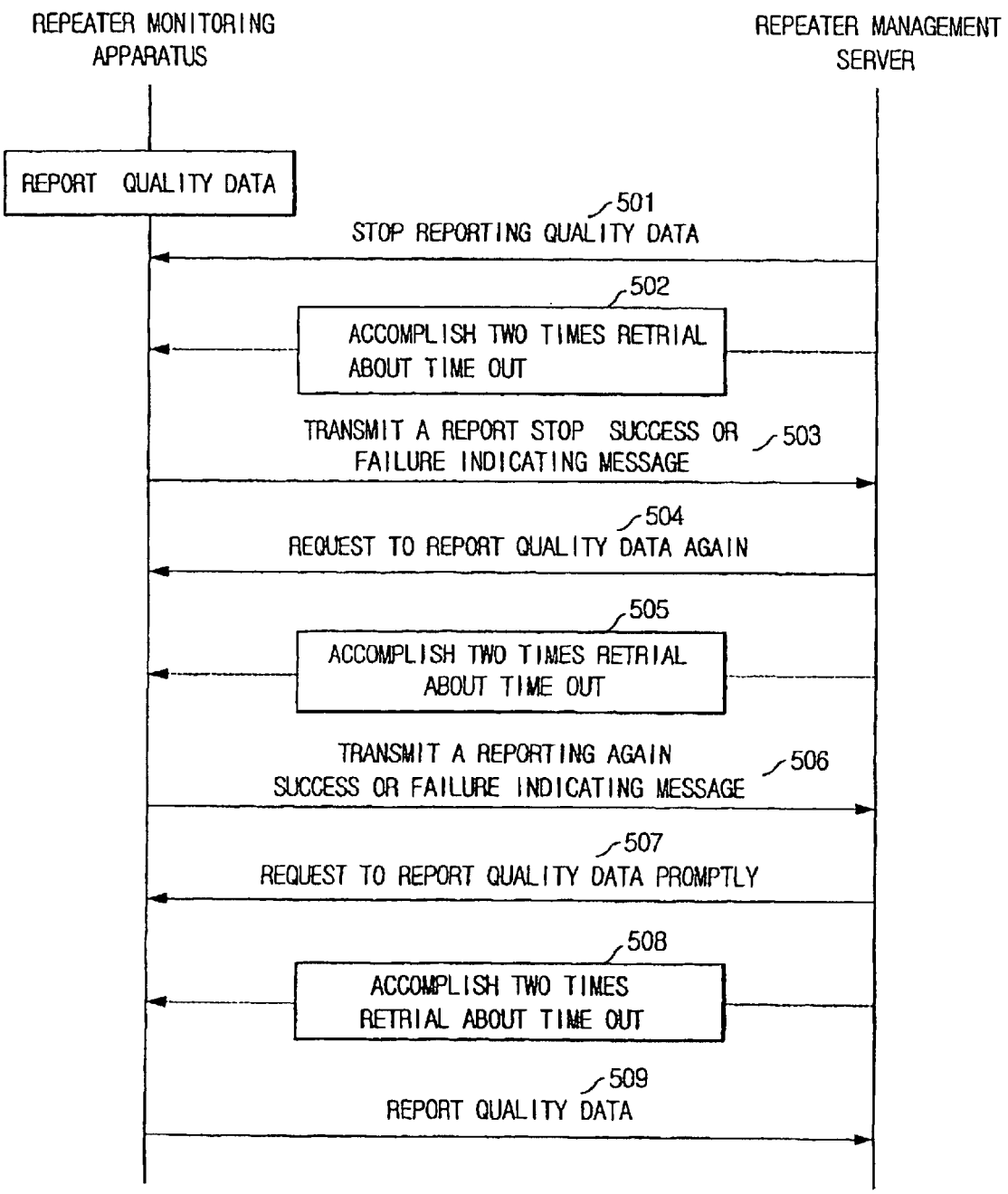
FIG. 5a is a flowchart illustrating the method for managing quality measurement in the present invention.
Figure 5B:
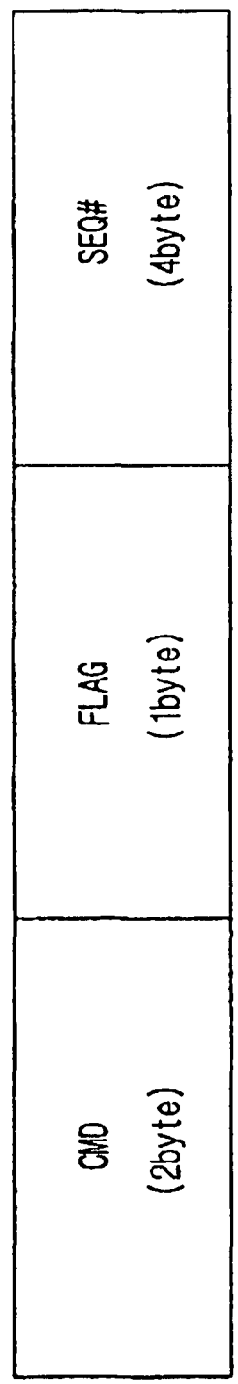
FIG. 5b is one example of a status control message in the present invention.

FIG. 5a is a flowchart for illustrating the method for managing the quality measurement in the present invention and FIG. 5b is one example of the status control message in the present invention.

Referring to FIG. 5a, the repeater management server 161 transmits the request to stop reporting the quality data to the repeater monitoring apparatus 11 through the control flag of a report status control message in order to stop reporting the quality data(501).

When the reset timer becomes a time out, the repeater management server 161 accomplishes several times(for example, two times) retrials repeatedly(502). The repeater monitoring apparatus 11 transmits a report stop success or failure indicating message corresponding to the received report stop information to the repeater management server 161(503).

Moreover, when the repeater management server 161 would like to restart to report the quality data from the repeater monitoring apparatus 11, the repeater management server 161 transmits report restart request information through the control flag of a report status control message (504).

When the reset timer becomes a time out, the repeater management server 161 accomplishes several times(for example, two times) retrials repeatedly(505). The repeater monitoring apparatus 11 transmits a report restart success or failure indicating message corresponding to the received report restart request information to the repeater management server 161(506).

Moreover, when the repeater management server 161 would like to report the quality data from the repeater monitoring apparatus 11 immediately, the repeater management server 161 transmits request to report quality data promptly through the control flag of a report status control message(507).

When the reset timer becomes a time out, the repeater management server 161 accomplishes several times(for example, two times) retrials repeatedly(508). The repeater monitoring apparatus 11 reports the quality data corresponding to the received report request immediately(509) And the report status control message(for example, about 7 byte) for control the report status of the repeater monitoring apparatus 11 will be described with reference to FIG. 5*b*.

Referring to FIG. 5*b*, the status control message comprises 'CMD' item, 'FLAG' item, 'Seq#' item.

The 'CMD' item is set as '03'. And the 'FLAG' item means a flag, and the 'Seq#' item means the sequential number(for example, the sequential number is one between 0000 and 9999) of the report status control message. For example, the 'FLAG' item 0 means report stop, the 'FLAG' 1 means prompt report.

FIG. 6*a* is one example of the process result message in the present invention and FIG. 6*b* is one example of the message of requesting to register again in the present invention.

The process result message of confirming certification, setting up the report period, setting up the report status between the repeater monitoring apparatus 11 and the repeater management server 161 will be described with reference to FIG. 6*a*.

Referring to FIG. 6*a*, the process result message comprises 'CMD' item, 'TYPE' item, 'FLAG' item, 'SEQ#' item. In the preferred one embodiment of the present invention, the 'CMD' item is set as '21', the 'TYPE' item is set as '0' or '2'.

When the 'TYPE' item is applied as '0', the repeater management server 161 transmits a certification confirming message to the repeater monitoring apparatus 11. Moreover, the message for 'TYPE' item '1' is report period settlement result message, and the message for 'TYPE' item '2' is report status settlement result message. And the 'TYPE' item is '1' or '2', the message is transmitted from the repeater monitoring apparatus 11 to the repeater management server 161. Moreover, the 'FLAG' item '0' means a success of certification confirm, the 'FLAG' item '1' means failure or certification impossibility.

Referring to FIG. 6*b*, a message for request the repeater monitoring apparatus 11 to register again comprises 'CMD' item, 'SEQ#' item. And the 'CMD' item is set as '04'.

Hereinafter, the concentration management method for managing the malfunction and quality of the repeater will be described in more detail.

First, the process that the repeater monitoring apparatus 11 monitors the repeater wireless(RF) channel is described.

The repeater monitoring apparatus 11 stores the decision noise list of the repeater set by a manager in order to collect the wireless quality data of repeaters. Moreover, the repeater monitoring apparatus 11 stores received signal strength indicators, repeater management parameters, repeater identification(ID), mother base station identification(ID) and repeater shape parameter like useful FA numbers. At this point, the repeater management parameter is critical value, for the signal-to-interference rate(Ec/Io) of the base station pilot channel, and malfunction status report timer value and other information.

The repeater monitoring apparatus 11 collects the wireless quality data of the repeaters periodically, and analyzes the wireless quality of the repeaters, and compares the repeater management parameter.

As the result of the comparison, when the repeater 13 is malfunction, the repeater monitoring apparatus 11 reports the repeater malfunction status to the repeater management server 161.

On the one hand, hereinafter the process that the repeater monitoring apparatus 11 estimates the telephone call quality of repeater by setting up the signal of particular number will be described.

The repeater monitoring apparatus 11 stores the signal settlement period and telephone call time set by the manager in order to collect the telephone call quality data of the repeater. Moreover, the repeater monitoring apparatus 11 stores the critical value of frame error rate, for analyzing and estimating the collected data, and repeater management parameter in order to collect the telephone call quality data of the repeater. At this point, the repeater management parameter is a duration and malfunction status report timer value and other information.

In addition, the repeater monitoring apparatus 11 request a signal about a particular number periodically. And when the signal is set, it collects the telephone call quality data. The repeater monitoring apparatus 11 repeats the several times process of collecting the telephone call quality data during telephone call(before a signal release request).

And the repeater monitoring apparatus 11 collects the telephone call quality data like a frame error rate(FER), and analyzes the telephone call quality of the repeater 13, and compares it with the repeater management parameter, and estimates it.

As the result of the estimation, when the telephone call is bad or inferior, the repeater monitoring apparatus 11 reports the malfunction status of the telephone call to the repeater management server 161.

On the other hand, the process that the repeater monitoring apparatus 11 processes the wireless quality data request received from the repeater management server 161 will be described.

The repeater management server 161 located in the network management center 16 requests the wireless quality data of the repeater 13 to the repeater monitoring apparatus 11 according to the period of the repeater 13 set by a manager.

When the repeater monitoring apparatus 11 receives the wireless quality data request from the repeater management server 161, reports the wireless quality estimation data analyzed to the repeater management server 161. Then the repeater management server 161 stores the wireless quality estimation data and reports the repeater 13 information estimated malfunction to the manager. When the repeater monitoring apparatus 11 can not transmits the wireless quality estimation data to the repeater management server 161, the repeater management server 161 transmits the wireless quality data request again.

On the other hand, the process that the repeater monitoring apparatus 11 requests the telephone quality request to the manager will be described.

The manager of the repeater management server 161 can request the telephone call quality of the repeater to the repeater monitoring apparatus 11. When the repeater management server 161 receives the telephone quality data request, requests a signal settlement to the repeater monitoring apparatus 11. Moreover, when the repeater monitoring apparatus 11 receives the signal settlement request from the repeater management server 161, transmits the signal settlement confirm signal to the repeater management server 161. While the repeater monitoring apparatus 11 requests the signal settlement and a line is busy, the repeater monitoring apparatus 11 collects and analyzes the telephone call quality data, and transmits the telephone quality data to the repeater management server 161.

When the repeater monitoring apparatus 11 can not transmit the telephone call quality data to the repeater management server 161, the repeater management server 161 transmits the telephone call quality data request again. Moreover, when the response of the several times transmission, the repeater management server 161 reports the malfunction status of the repeater 13 to the manager.

On the other hand, the process that the repeater management server 161 connects a mobile signal to the repeater monitoring apparatus 11 and determines the malfunction status will be described.

The manager of the repeater management server 161 confirms the telephone call quality by setting up a signal to the repeater monitoring apparatus 11 in order to confirm the status of the repeater 13 reported as malfunction status. At this point, the repeater monitoring apparatus 11 feedbacks a voice signal.

Moreover, the repeater management server 161 can process a various statistical data by using the received quality data. Moreover, the repeater management server 161 can manage the malfunction of the repeater and repair list by using the statistics process.

The statistics process result can be made various type graph and report. Moreover, the statistics process according to a fixed period, the statistics process corresponding to a repeater type, the statistics process corresponding to the repeater location and other information. At this point, the various type graph can be a bar graph, a graph of broken line, a circular graph and other information. The fixed period can be a date period, a daily period, a monthly period and other information. Moreover, the repeater type can be a frequency repeater, a lighter repeater and other information. The location can be a head office, a telephone exchange, au operation team and other information.

Industrial Applicability

As described above, according to the present invention's apparatus and method for monitoring the repeaters, the present invention can provide the repeater monitoring method and system for making sure of the stability of operation because the repeater monitoring apparatus monitors the main warning like the occurrence of a opposite direction noise directly.

Moreover, the present invention can provide the system and method for accomplishing the repeater monitoring function regardless of the repeater type, by using the mobile communications terminal, at a cheap cost.

Moreover, the present invention can provide the system and method for saving personnel expenses by reducing an operation manpower for measuring the quality.

Moreover, the present invention can provide the system and method for settling an efficient operation preservation system by system construction, and managing customer's civil appeals directly.

Moreover, the present invention can provide the system and method for measuring and managing the wireless quality and the telephone call quality of the repeaters installed in order to enlarge a service area remotely.

Moreover, the present invention can provide the system and method for accomplishing the economical efficiency of the repeater operation by enlarging the repeater management and the efficiency of the operation.

What is claimed is:

1. A repeater monitoring system for enlarging service areas based on a wireless communications network, comprising:
   a repeater monitoring apparatus for selecting waves transferred from repeaters, and analyzing the waves by using programs, and transmitting analyzed results;
   an SMS center for receiving the analyzed results from the repeater monitoring apparatus, and transmitting the analyzed results;
   a repeater management server for receiving the analyzed results from the SMS center and managing a plurality of repeaters; and
   a storage apparatus for saving the analyzed results received from the repeater management server,
   wherein the analyzed result comprises at least one selected from the group consisting of an analysis time, an identification of a terminal manufacturing company corresponding to a mobile communications company (SID), a telephone exchange identification used by the repeater (NID), a noise measurement (PILOT PN), a received message signal strength indicator (RSSI), a signal-to-interference rate(Ec/Io), and a transmitted message signal strength indicator (TX PWR).

2. The system of the claim 1, wherein the analyzed results received from the repeater monitoring apparatus are information of short message type.

3. The system of claim 1, wherein the SMS center further comprises the means for searching and selecting a short message including the analyzed results from the plural short messages.

4. The system of the claim 1, wherein the repeater management server modifies an analysis result transmission period of the repeater monitoring apparatus through the communications network.

5. The system of the claim 4, wherein the communications network is a mobile communications network.

6. The system of the claim 1, wherein the repeater monitoring apparatus comprises an incoming terminal and an incoming line for drawing external power sources, the transformer for adjusting the power sources.

7. The system of the claim 6, wherein the power sources transformed by the transformer is at least one selected from the group consisting of 12V, 7.2V, 3.6V.

8. The system of the claim 1, wherein the repeater monitoring apparatus further comprises the external wave cover case for connecting the repeater with itself.

* * * * *

UNITED STATES PATENT AND TRADEMARK OFFICE
CERTIFICATE OF CORRECTION

PATENT NO. : 6,941,137 B2  
APPLICATION NO. : 10/018570  
DATED : September 6, 2005  
INVENTOR(S) : Sang-Wook Park Page 1 of 1

It is certified that error appears in the above-identified patent and that said Letters Patent is hereby corrected as shown below:

On title page, item (30), in the Foreign Application Priority Data, " April 7, 2000"

should read -- April 27, 2000--.

Signed and Sealed this

Second Day of January, 2007

JON W. DUDAS  
*Director of the United States Patent and Trademark Office*